Nov. 10, 1936.    G. M. SCHRADER ET AL    2,060,696
DANDELION BED KNIFE GUARD
Filed May 5, 1936
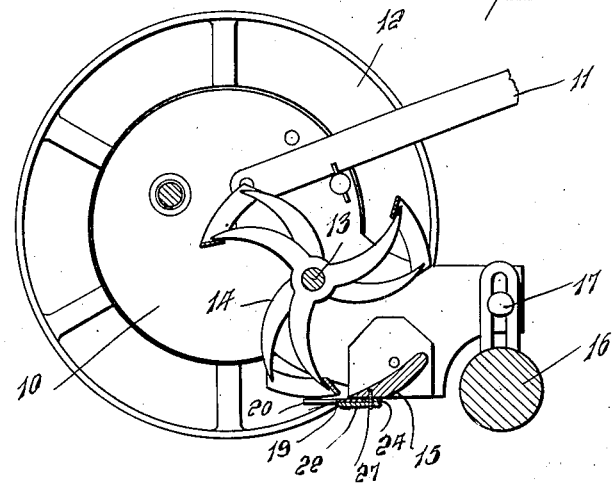
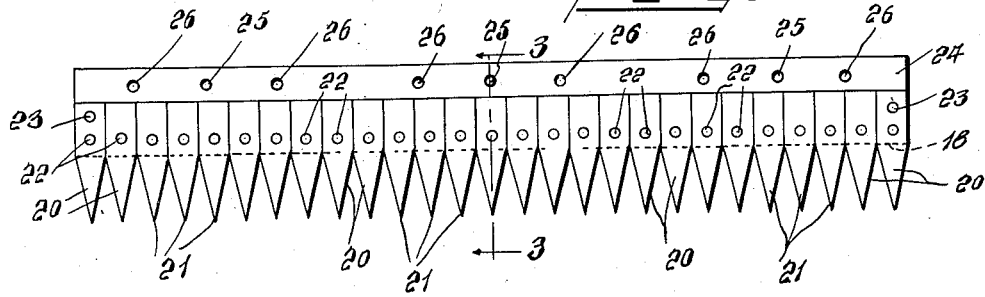
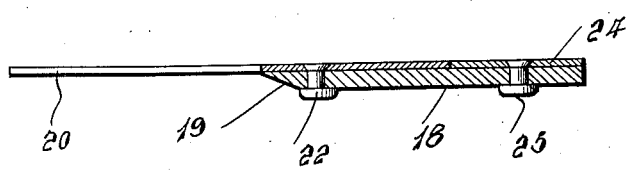
Inventors
G. M SCHRADER,
R. J. H. DANNENBERG Patented Nov. 10, 1936

2,060,696

UNITED STATES PATENT OFFICE

2,060,696

DANDELION BED KNIFE GUARD

George M. Schrader and Robert J. H. Dannenberg, Du Page Township, Will County, Ill.

Application May 5, 1936, Serial No. 78,010

2 Claims. (Cl. 56—294)

This invention relates to a guard or means attachable to the bed knife or fixed cutter of a mower, so that the same will engage and hold dandelion flower stems so that they will be positively cut off, rather than be crushed beneath the mower as is prevalent with ordinary mowers. Such a device or attachment will remove the unsightly white heads of the stems on lawns and particularly on golf courses.

The more specific objects and advantages will become apparent from a consideration of the description following taken in connection with accompanying drawing illustrating an operative embodiment.

In said drawing:—

Figure 1 is a view in central longitudinal section showing our improvements applied to a lawn or fairway mower;

Figure 2 is a plan view of the attachment; and

Figure 3 is an enlarged sectional view through the attachment.

Referring specifically to the drawing wherein like reference characters designate like or similar parts, a conventional lawn or fairway mower is disclosed at 10, having the usual handle 11, ground wheels 12 and gearing (not shown), to drive a shaft 13 through the operation of the ground wheels and which shaft carries a cutting reel 14.

Associated with the cutting reel 14 is the fixed cutter or bed plate 15 and in the rear thereof is the ground engaging roller 16, adjustable as to height as at 17 on the frame of the mower.

Our improvements, as detailed in Figures 2 and 3 consist of a plate 18 upwardly beveled at 19 at the forward end, so as not to tend to penetrate the soil or have obstructive engagement therewith. Arranged side by side, with their longitudinal edges in contact, are a series of tines 20. These tines are relatively thin, and are pointed as at 21 forwardly of the plate 18. Each tine is secured to the plate 18 by means of a suitable rivet 22 and the end tines are secured to such a plate by an additional rivet as at 23. The rear ends of the tines 20 abut a fastening strip 24 disposed on the plate 18 and riveted thereto at intervals as at 25. In addition, a series of openings 26 are provided through the plates 18 and 24, in registry, and therethrough machine screws 27 are passed which rigidly secure the attachment to the fixed cutter 15 as shown in Figure 1, the tines at their pointed ends as well as the forward part of the plate 18, projecting rearwardly slightly beyond the cutting edge of the cutter 15.

As a result of the construction described, as the mower is moved over the lawn or fairway, the tines 20 at their points 21 will engage the dandelion stems or similar vegetation, which will enter between the points 21, be straightened, and the heads either pulled off as the spaces lead to points at their rear ends or are cut off by the movement of the cutting edge portions of the reel 14 against the upper surfaces of the tines and the fixed cutter 15. As the result, the dandelions are not crushed or depressed by the mower without cutting and hence the lawn or fairway may be kept clear of the dandelion or similar stems and unsightly heads.

We claim as our invention:—

1. A guard construction for attachment to the fixed cutter of a mower so that the reel of the mower will operate relatively close thereto, the guard comprising a plurality of longitudinally extending tines, said tines at their rear portions abutting each other at the sides and said tines at their forward portions being pointed, a plate to which the tines are secured, and a fastening strip on the plate abutting the rear ends of said tines.

2. A guard construction for attachment to the fixed cutter of a mower so that the reel of the mower will operate relatively close thereto, the guard comprising a plurality of longitudinally extending tines, said tines at their rear portions abutting each other at the sides and said tines at their forward portions being pointed, a plate to which the tines are secured, a fastening strip on the plate abutting the rear ends of said tines, a fastening passing through each tine and securing it to the plate, the forward end of the plate being beveled, an additional fastening in the outermost tines, fastenings passing through the securing strip and plate, and fastenings passing through the plate and securing strip engageable in the fixed cutter of the mower.

GEORGE M. SCHRADER.
ROBERT J. H. DANNENBERG.